(12) United States Patent
Schaefer et al.

(10) Patent No.: US 11,793,619 B2
(45) Date of Patent: Oct. 24, 2023

(54) PERSONAL HYGIENE DEVICE

(71) Applicant: Braun GmbH, Kronberg (DE)

(72) Inventors: Norbert Schaefer, Frankfurt (DE);
Uwe Schober, Glashuetten (DE);
Robert Schäfer, Frankfurt (DE);
Matthias Paschold, Wolmirstedt (DE);
Tobias Schwarz, Schmitten (DE)

(73) Assignee: Braun GmbH, Kronberg (DE)

(*) Notice: Subject to any disclaimer, the term of this patent is extended or adjusted under 35 U.S.C. 154(b) by 522 days.

(21) Appl. No.: 16/864,563

(22) Filed: May 1, 2020

(65) Prior Publication Data
US 2020/0345130 A1    Nov. 5, 2020

(30) Foreign Application Priority Data

May 2, 2019 (EP) .................................. 19172245
Mar. 16, 2020 (EP) .................................. 20163232

(51) Int. Cl.
*A61C 17/34* (2006.01)
*A46B 15/00* (2006.01)
*A46B 13/02* (2006.01)

(52) U.S. Cl.
CPC ...... *A61C 17/3436* (2013.01); *A46B 15/0022* (2013.01); *A46B 13/026* (2013.01);
(Continued)

(58) Field of Classification Search
CPC .............. A61C 17/3436; A61C 17/221; A46B 15/0012; A46B 15/0022
See application file for complete search history.

(56) References Cited

U.S. PATENT DOCUMENTS 4,541,034 A  9/1985 Fanning
8,522,797 B2* 9/2013 Dickie ................. A61C 15/047
                                              132/309
(Continued)

FOREIGN PATENT DOCUMENTS

CN     1628013 A    6/2005
CN   102413790 A    4/2012
(Continued)

OTHER PUBLICATIONS

Extended European Search Report and Search Opinion; Application Ser. No. 19172245.3; dated Oct. 29, 2019; 8 pages.
(Continued)

*Primary Examiner* — Laura C Guidotti
(74) *Attorney, Agent, or Firm* — Vladimir Vitenberg

(57) ABSTRACT

A personal hygiene device has a drive unit having a support, a stator fixedly mounted at the support, and an armature spring-mounted at the support for driven linear oscillating motion along a first longitudinal direction parallel to or coinciding with an x-axis of an x-y-z coordinate system. The armature has a center of gravity located in rest at a coordinate $[x_a, y_a, z_a]$, and a drive shaft fixedly coupled with the armature and having a center of gravity located in rest at a coordinate $[x_d, y_d, z_d]$. A first treatment head assembly, detachably connected to the drive shaft, has a center of gravity located in rest at a coordinate $[x_{t1}, y_{t1}, z_{t1}]$. A secondary mass element, spring-mounted at the support for essentially linear oscillating motion along the first longitudinal direction, has a center of gravity located in rest at a coordinate $[x_m, y_m, z_m]$. At least the coordinate $[x_a, y_a, z_a]$ of the center of gravity of the armature has an offset in at least one of the y-direction and z-direction with respect to the coordinate $[x_d, y_d, z_d]$ of the center of gravity of the drive-shaft or with respect to the coordinate $[x_{t1}, y_{t1}, z_{t1}]$ of the center of gravity of the first treatment head assembly, i.e., (Continued)

$y_a \neq y_d$ and/or $y_a \neq y_{t1}$ and/or $z_a \neq z_d$ and/or $z_a \neq z_{t1}$; and the secondary mass element is configured such that the coordinate $[x_m, y_m, z_m]$ of the center of gravity of the secondary mass element is aligned with the coordinate $[x_j, y_j, z_j]$ of the joint center of gravity of the drive shaft, the first treatment head assembly and the armature in the at least one offset direction, i.e., $y_m = y_j$ and $z_m = z_j$, so that a line connecting the coordinate $[x_m, y_m, z_m]$ of the center of gravity of the secondary mass element and the coordinate $[x_j, y_j, z_j]$ of the joint center of gravity is parallel to or coincides with the x-axis.

12 Claims, 4 Drawing Sheets

(52) U.S. Cl.
CPC ....... *A46B 15/0006* (2013.01); *A46B 15/0012* (2013.01); *A46B 2200/1066* (2013.01)

(56) References Cited

U.S. PATENT DOCUMENTS

| | | |
|---|---|---|
| 2003/0236026 A1 | 12/2003 | Endo |
| 2010/0066182 A1 | 3/2010 | Yamazaki |
| 2011/0289699 A1 | 12/2011 | Schaefer |
| 2011/0314677 A1 | 12/2011 | Meier |
| 2012/0019079 A1 | 1/2012 | Ziegler et al. |
| 2012/0021382 A1 | 1/2012 | Dickie |
| 2013/0029290 A1 | 1/2013 | Utsch et al. |
| 2014/0015346 A1 | 1/2014 | Schober |
| 2015/0198215 A1 | 7/2015 | Koyama |
| 2016/0046028 A1 | 2/2016 | Meier et al. |
| 2017/0079421 A1 | 3/2017 | Tamminga |
| 2018/0019650 A1 | 1/2018 | Schober |
| 2018/0087631 A1 | 3/2018 | Kramp |
| 2019/0125067 A1* | 5/2019 | Schaefer ............... A46B 13/023 |

FOREIGN PATENT DOCUMENTS

| | | | |
|---|---|---|---|
| CN | 103025268 A | 4/2013 | |
| CN | 103026602 A | 4/2013 | |
| CN | 104488176 A | 4/2015 | |
| CN | 108258874 A | 7/2018 | |
| EP | 2790309 | 10/2014 | |
| WO | WO 2014/009916 A2 * | 1/2014 | ......... A61C 17/3436 |
| WO | WO2019130705 | 7/2019 | |

OTHER PUBLICATIONS

Extended European Search Report and Search Opinion; Application Ser. No. 20163232.0; dated Aug. 11, 2020; 5 pages.
International Search Report and Written Opinion; Application Ser. No. PCT/IB2020/054131; dated Aug. 11, 2020; 15 pages.

* cited by examiner

(12) United States Patent

PERSONAL HYGIENE DEVICE

FIELD OF THE INVENTION

The present disclosure is concerned with personal hygiene devices comprising a drive unit having a stator-armature assembly where the armature is spring mounted at a support and a secondary mass element that is spring mounted at the support.

BACKGROUND OF THE INVENTION

It is generally known that a personal hygiene device such as an electric toothbrush can be driven by a resonant motor comprising a stator and an armature that is driven into a reciprocating motion and is forced into its rest position by a restoring force (which restoring force may typically be provided by at least one resilient element such as a leaf spring). Various designs of such a resonant motor are known to the skilled person. The resonant motor may drive a drive shaft into a linear reciprocating motion. The personal hygiene device may be equipped with a secondary spring-mass resonator that is arranged to cancel vibrations that are produced by the reciprocating armature of the resonant motor by generating a counter-cyclic motion and thus generating vibrations having about the same amplitude, but a phase shifted by 180 degrees. Document WO 2014/009916 A2 discloses one possible design of such a resonant motor.

There is a general need to optimize the vibrational behavior of personal hygiene devices comprising a drive with a moving armature and a secondary mass element for cancelling the vibrations generated by the moving armature.

SUMMARY OF THE INVENTION

In accordance with at least one aspect, a personal hygiene device, extending in a 3-dimensional space that is spanned by a x-y-z coordinate system, comprising a drive unit having a support, a stator fixedly mounted at the support, an armature that is spring-mounted at the support for driven linear oscillating motion along a first longitudinal direction that is parallel to or coincides with the x-axis of the x-y-z coordinate system, the armature having a center of gravity located in rest at a coordinate $[x_a; y_a; z_a]$, and a drive shaft fixedly coupled with the armature, the drive shaft having a center of gravity located in rest at a coordinate $[x_d; y_d; z_d]$, a first treatment head assembly detachably connected to the drive shaft, the first treatment assembly having a center of gravity located in rest at a coordinate $[x_{t1}; y_{t1}; z_{t1}]$, and a secondary mass element spring-mounted at the support for essentially linear oscillating motion along the first longitudinal direction, the secondary mass element having a center of gravity located in rest at a coordinate $[x_m; y_m; z_m]$, wherein at least the coordinate $[x_a; y_a; z_a]$ of the center of gravity of the armature has an offset in at least one of the y-direction and z-direction with respect to the coordinate $[x_d; y_d; z_d]$ of the center of gravity of the drive-shaft or with respect to the coordinate $[x_{t1}; y_{t1}; z_{t1}]$ of the center of gravity of the first treatment head assembly, i.e. $y_a \neq y_d$ and/or $y_a \neq y_{t1}$ and/or $z_a \neq z_d$ and/or $z_a \neq z_{t1}$, and the secondary mass element is designed such that the coordinate $[x_m; y_m; z_m]$ of the center of gravity of the secondary mass element is aligned with the coordinate $[x_j; y_j; z_j]$ of the joint center of gravity of the drive shaft, the first treatment head assembly and the armature in the at least one offset direction, i.e. $y_m = y_j$ and $z_m = z_j$, so that a line connecting the coordinate $[x_m; y_m; z_m]$ of the center of gravity of the secondary mass element and the coordinate $[x_j; y_j; z_j]$ of the joint center of gravity is parallel to or coincides with the x-axis.

BRIEF DESCRIPTION OF THE DRAWINGS

The present disclosure will be further elucidated by a detailed description of example embodiments and by reference to figures. In the figures

DETAILED DESCRIPTION OF THE INVENTION

Figure 1:
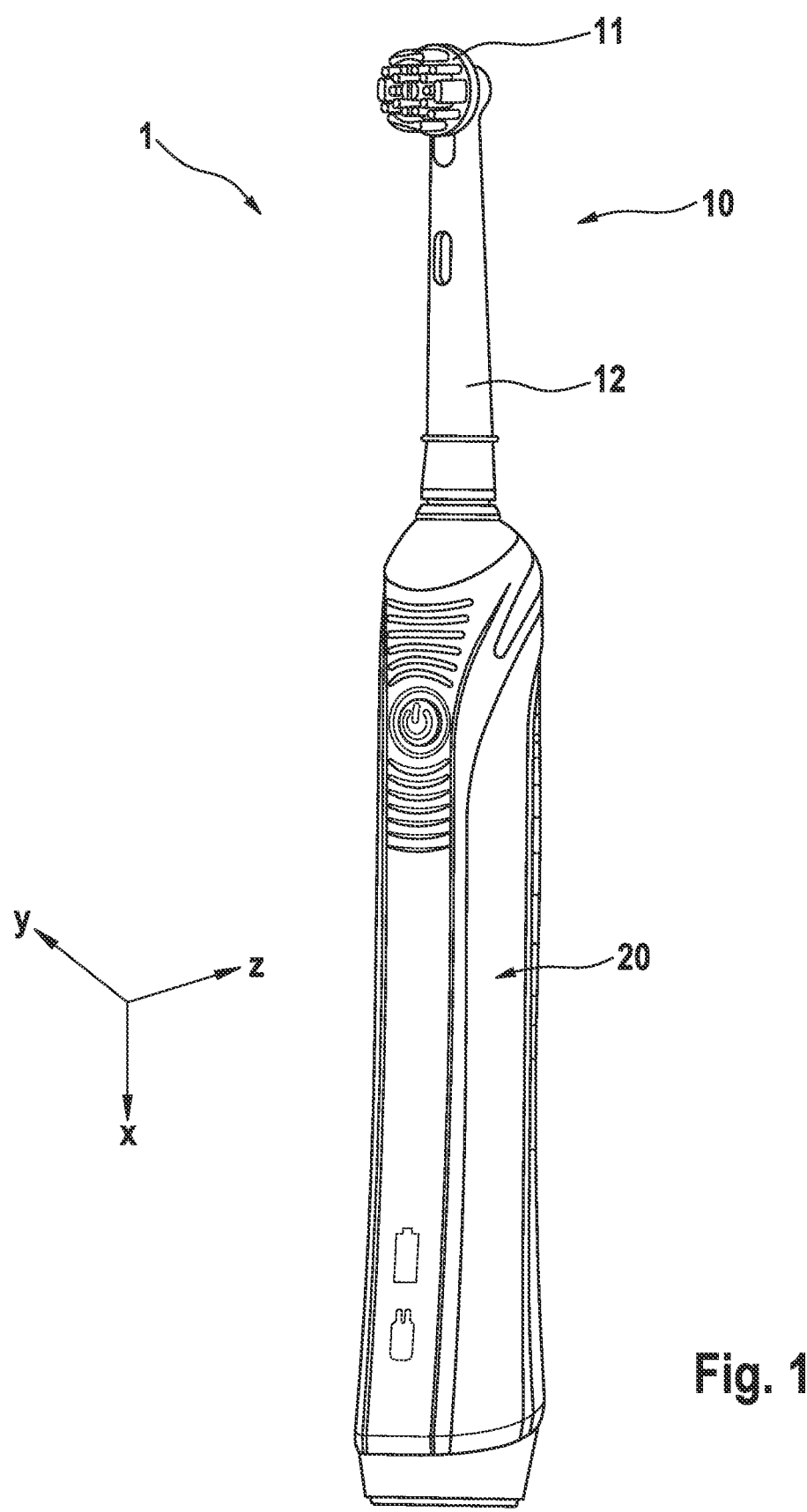
FIG. 1 is a schematic depiction of a personal care device realized as an electric toothbrush.

In the context of the present description "personal hygiene" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("hygiene") and on the other hand the cosmetic treatment and improvement of the appearance of the skin and its adnexa. It shall include the maintenance and strengthening of wellbeing. This includes skin care, hair care, and oral care as well as nail care. This further includes other grooming activities such as beard care, shaving, and depilation. A "personal hygiene device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal hygiene device may have a more pronounced benefit in one or several of these nurturing or device areas than in one or several other of these areas.

A personal hygiene device as proposed comprises a treatment head for providing a hygiene treatment. An electric toothbrush is one example of an electric personal hygiene device, particularly an example of the group of electric oral care devices.

In accordance with the present disclosure, the personal hygiene device has a drive unit that comprises a support, a stator fixedly mounted at the support and an armature that is spring-mounted at the support for driven linear oscillating motion along a first longitudinal direction that is parallel to or coincides with the x-axis of the x-y-z coordinate system. The armature has a center of gravity located in rest at a coordinate of the x-y-z coordinate system that is denoted by $[x_a; y_a; z_a]$, where $x_a$ is the x-component, $y_a$- is the y-component and $z_a$ is the z-component, which denotation will be used in the following. The armature may be mounted at the support by at least one planar leaf spring, in particular by at least two planar leaf springs, which planar leaf springs extend at rest in a plane parallel to the y-z plane of the x-y-z coordinate system.

In accordance with the present disclosure, the personal hygiene device has a drive shaft that is fixedly coupled with the armature, the drive shaft has a center of gravity located in rest at a coordinate $[x_d; y_d; z_d]$. The personal hygiene device further has a first treatment head assembly that is detachably connected to the drive shaft. The first treatment assembly has a center of gravity located in rest at a coordinate $[x_{t1}; y_{t1}; z_{t1}]$. The personal hygiene device also comprises a secondary mass element that is spring-mounted at the support for linear oscillating motion along the first longitudinal direction, the secondary mass element having a center of gravity located in rest at a coordinate $[x_m; y_m; z_m]$. The secondary mass element may be mounted at the support by at least one planar leaf spring, in particular by at least two planar leaf springs, which planar leaf springs extend at rest in a plane parallel to the y-z plane of the x-y-z coordinate system.

In accordance with the present disclosure, at least the coordinate $[x_a; y_a; z_a]$ of the center of gravity of the armature has an offset in at least one of the y-direction and z-direction with respect to the coordinate $[x_d; y_d; z_d]$ of the center of gravity of the drive-shaft or with respect to the coordinate $[x_{t1}; y_{t1}; z_{t1}]$ of the center of gravity of the first treatment head assembly, i.e. $y_a \neq y_d$ and/or $y_a \neq y_{t1}$ and/or $z_a \neq z_d$ and/or $z_a \neq z_{t1}$. The secondary mass element is designed such that the coordinate $[x_m; y_m; z_m]$ of the center of gravity of the secondary mass element is aligned with the coordinate $[x_j; y_j; z_j]$ of the joint center of gravity of the drive shaft, the first treatment head assembly and the armature in the at least one offset direction, i.e. $y_m = y_j$ and $z_m = z_j$, so that a line connecting the coordinate $[x_m; y_m; z_m]$ of the center of gravity of the secondary mass element and the coordinate $[x_j; y_j; z_j]$ of the joint center of gravity is parallel to or coincides with the x-axis.

It is known that a system as described leads to low vibrations on the outer surface of the handle that is grasped by a user as the forces transmitted by the mounting spring or springs of the moving armature (together with the masses attached to the armature) and by the mountings spring or springs of the counter-oscillating secondary mass element to the support cancel each other, which was in particular achieved by making those masses close to each other or even making these masses identical and in particular adapting the mounting springs so that the resonance frequency of the spring-mounted secondary mass element is as close to the drive frequency as possible. WO 2014/009916 A2 discusses this in general. But it was found that a design as shown and discussed in WO 2014/009916 A2 still leads to remaining vibrations that a user can feel when holding the handle. It was found that such remaining vibrations can be associated with an offset between the joint center of gravity of armature, drive shaft and first treatment head assembly in the y-z plane and the center of gravity of the secondary mass element in the y-z plane. i.e. an offset in at least one of the y or z directions. In a design following the general description of WO 2014/009916 A2, an offset in z-direction is triggered due to the particular shape of the armature. Aligning the centers of gravity such that their y-components and their z-components have the same value, as is proposed herein, reduced the remaining vibrations. This means that aligning the centers of gravity such that the line connecting the two centers of gravity is parallel to (or coinciding with) the x-axis of the above defined x-y-z coordinate system reduces the vibrations felt at the handle simulation results are discussed further below in connection with FIGS. 4A and 4B.

The personal hygiene device as proposed may comprise a handle section having a handle housing that can be grasped by a user's hand. The support of the drive unit may itself be pivot mounted with respect to the handle housing. A resilient element such as a spring element may provide a restoring force against any force that pivots the support around the pivot axis. The support may be coupled with a force sensor enabling to measure the force that acts on the support to pivot it. The personal hygiene device may comprise a replacement brush head that either itself forms a treatment head or that has a treatment head housing with respect to which the treatment head is mounted for driven motion. The treatment head housing may then be fixedly coupled with the support. The treatment head may be mechanically coupled with a motion transmitter to form a treatment head assembly.

The drive unit may comprise a periodic drive signal (e.g. an alternating current) that is used to drive the armature into a reciprocating motion. The drive frequency of the periodic drive signal may be chosen to lie in a range of between 100 Hz and 200 Hz, in particular in a range of between 120 Hz and 170 Hz, further in particular in a range of between 140 Hz and 150 Hz.

The armature may integrally comprise the drive shaft or the drive shaft may be detachably coupled with the armature. The drive shaft is used to transmit the motion provided by the armature to the driven treatment head. The drive shaft may be magnetically coupled with the treatment head assembly comprising the treatment head. The armature (together with any other masses connected with the armature) forms a resonant spring-mass system by virtue of the spring or springs by which the armature is mounted at the support. The armature may comprise at least one permanent magnet and the stator may comprise a coil that receives an alternating current at a drive frequency, where the drive frequency is chosen to lie at or close to the resonant frequency of the armature-spring system. The secondary mass system that is spring mounted at the support forms a further resonant spring-mass system that may be considered as being independent from the armature-spring system if the support can be assumed to be spatially fixed. The drive frequency may be chosen to lie at or as close as possible to the resonance frequency of the secondary mass element-spring system. The secondary mass element-spring system is arranged to be excited into a linear reciprocating motion by the vibrations of the support generated by the armature-spring system. The linear motion of the secondary mass element is phase shifted by 180 degrees with respect to the armature motion. The secondary mass element may be made from stacked metal sheets.

The personal hygiene device and the drive unit extend in three-dimensional space, which 3D space can be spanned by a Cartesian coordinate system so that each point in space can be defined by coordinates $[x; y; z]$. At rest, the various elements of the drive unit, in particular the armature, the secondary mass element, the drive shaft, and the treatment head assembly each have a center of gravity that thus can be determined by respective coordinates as was already discussed, e.g. coordinate $[x_a; y_a; z_a]$ denotes the center of gravity of the armature, coordinate $[x_m; y_m; z_m]$ denotes the center of gravity of the secondary mass element, coordinate $[x_d; y_d; z_d]$ denotes the center of gravity of the drive shaft, and coordinate $[x_{t1}; y_{t1}; z_{t1}]$ denotes the center of gravity of the first treatment head assembly. Here, "first" is used to differentiate the first treatment head assembly being part of the personal hygiene device from a potential further (second) treatment head assembly. A personal hygiene kit may then comprise a personal hygiene device and at least one further replacement head comprising a second treatment head assembly. The mass and the coordinate $[x_{t1}; y_{t1}; z_{t1}]$ of the center of gravity of the second treatment head assembly may be chosen such that the two different replacement heads generate different vibration characteristics of the personal hygiene device.

FIG. 1 is a depiction of an example personal hygiene device 1 realized as an electric toothbrush. The personal hygiene device 1 comprises a handle section 20 and a first replacement head 10 that is detachably mounted at the handle section 20. The first replacement head 10 may comprise a first treatment head 11 mounted at a first treatment head housing 12 for driven motion relative to the first treatment head housing 12. A first motion transmitter may be coupled with the first treatment head 11 and may be disposed in a hollow of the first treatment head housing 12. The first treatment head 11 and the first motion transmitter together may then form a first treatment head assembly as will be discussed in more detail further below. The first replacement head 10 may be detached and replaced by a new, essentially identical replacement head when the first replacement head 10 is worn out or the first replacement head 10 may be complemented by at least a second replacement head that provides a different treatment or that is intended for usage by a different user. In the present case an electric toothbrush is shown and the first replacement head 10 is realized as a brush head that provides a first cleaning treatment of the teeth. A second brush head (i.e. second replacement head) may be provided that is different to the first brush head and that provides a different treatment effect, e.g. the second brush head may be structured for better tooth polishing effect or for a better gum massaging effect than the first brush head.

Figure 2:
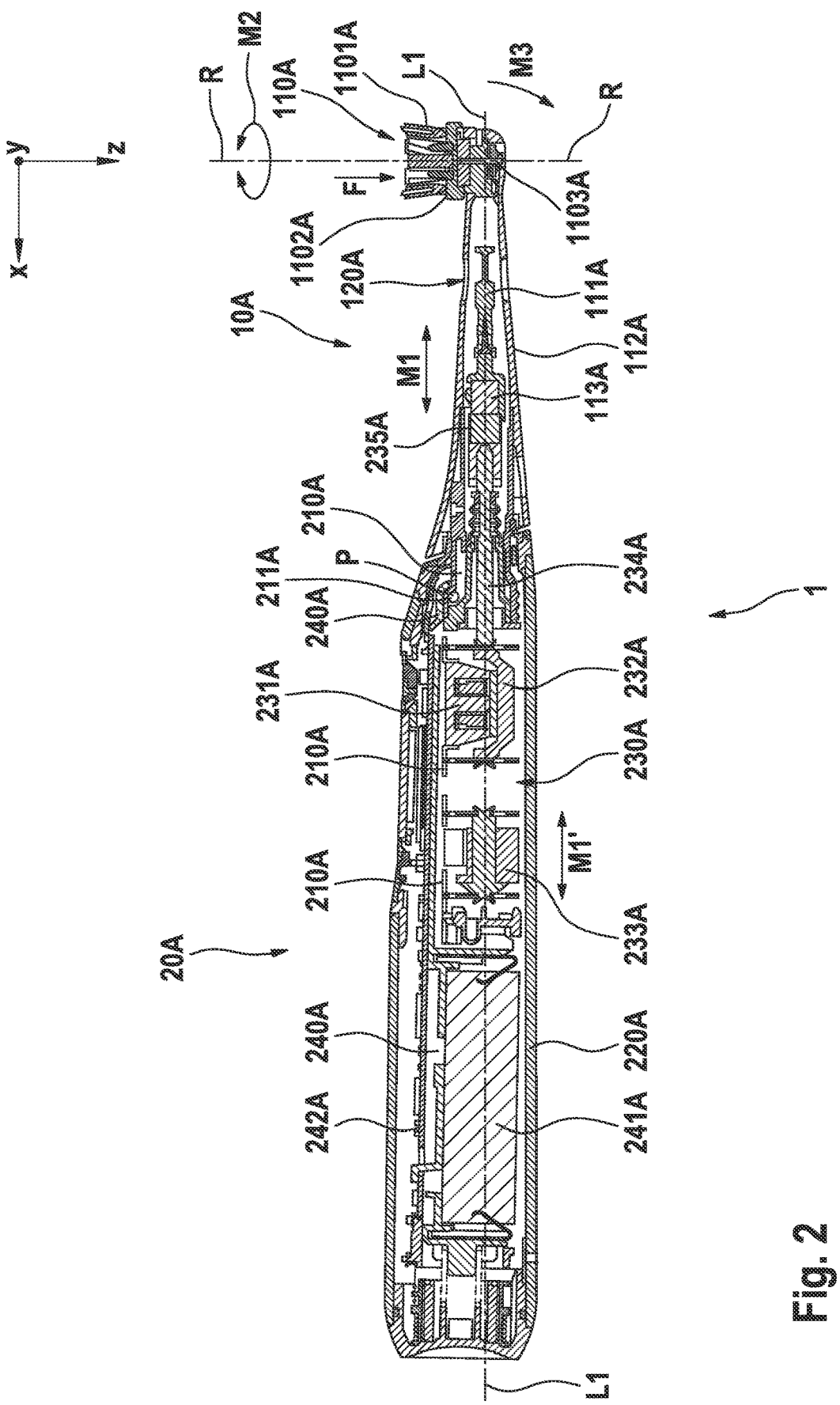
FIG. 2 is a cross section through an example personal hygiene device realized as an electric toothbrush.

FIG. 2 is a cross sectional view of an example personal hygiene device 1A in accordance with the present disclosure, which personal hygiene device extends in Euclidian 3D space spanned by a Cartesian x-y-z coordinate system allowing to define absolute positions in space and relative distances. The Cartesian coordinate system is used here as an example of all possible coordinate systems that can be used to span the Euclidian 3D space. The personal hygiene device 1A is realized as an electric toothbrush, which shall be considered as a non-limiting example, and comprises a handle section 20A and a first replacement head 10A. The first replacement head 10A comprises a first treatment head 110A and a first motion transmitter 111A that together form a first treatment head assembly 120A. The first treatment head 110A here comprises a carrier element 1102A on which at least one treatment element 1101A is mounted, where in the shown example a plurality of filament tufts are mounted on the carrier element 1102A. The first treatment head 110A is here mounted at the first treatment housing 112A for driven oscillatory rotation M2 around a rotation axis R that is defined by an axle 1103A. The first motion transmitter 111A comprises a coupling portion 113A that is pivotably connected with the rest of the first motion transmitter 111A. The first treatment head 110A is mounted at a first treatment head housing 112A. The first treatment head housing 112A is detachably connected with a treatment head adapter 235A of the handle section 20A.

The handle section 20A comprises a handle housing 220A and a support 210A that is pivotably mounted with respect to the handle housing 220A so that the support 210A can pivot around a pivot axis P that is defined by an axle 211A. The support 210A carries a drive unit 230A that comprises a stator 231A fixedly mounted at the support 210A, an armature 232A and a secondary mass element 233A that are each spring mounted at the support 210A. The stator 231A may comprise a coil and the armature 232A may comprise at least one permanent magnet as is generally known in the art so that the armature 232A can be driven into a linear reciprocating motion M1 when an alternating current is provided to the coil. The drive frequency of the alternating current may be chosen to be in a range of between 100 Hz and 200 Hz. A drive shaft 234A is here fixedly connected with the armature 232A, which drive shaft extends along a longitudinal axis L that coincides with or is parallel to the x-axis of the Cartesian x-y-z coordinate system (in the shown example, the longitudinal axis L is parallel to the x-axis of the shown Euclidian coordinate system). The front end of the drive shaft 234A may comprise a permanent magnet for coupling with another permanent magnet or magnetizable metal element provided at the coupling portion 113A of the first motion transmitter 111A. The treatment head adapter 235A forms a front-end portion of the support 210A so that an external force F having a component in positive z-direction applied at the first treatment head 110A leads to a pivoting motion of the support 210A around the pivot axis P. The support 210A may be spring mounted with respect to the handle housing 220A, so that a restoring spring force will act to bring the support 210A back into its rest position.

The personal hygiene device 1A may comprise a chassis element 240A that may carry an energy source 241A such as a battery or a rechargeable accumulator and a PCB 242A comprising the control electronics and potentially at least one sensor for, e.g., measuring the deflection of the support 210A relative to the handle housing 220A. The support 210A may in particular be pivotably mounted at the chassis element 240A and the chassis element 240A may be fixedly secured at the handle housing 220A so that the chassis element 240A may be considered as a portion of the handle housing 220A.

Figure 3:
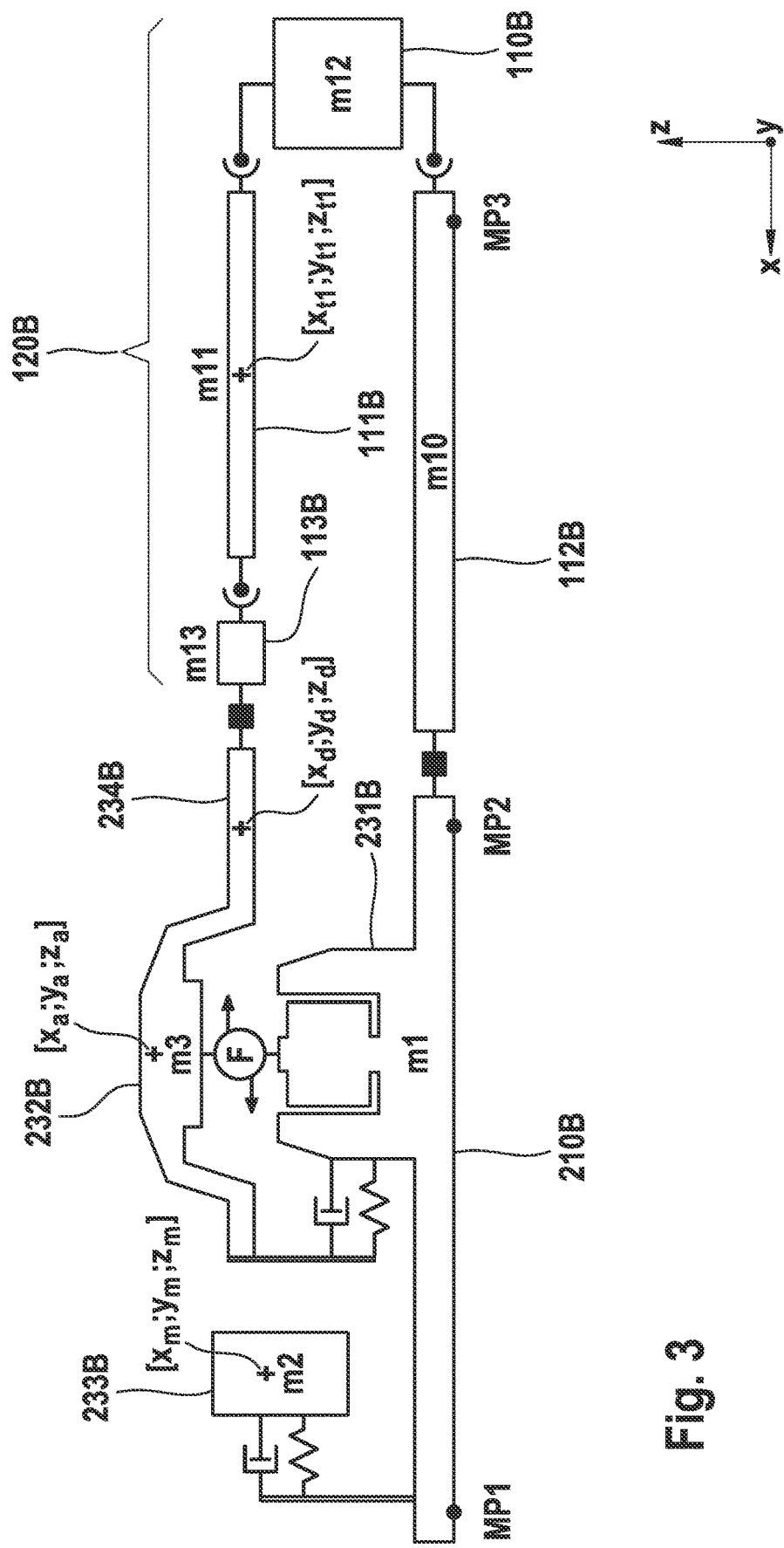
FIG. 3 is a schematic depiction of the coupled masses of an example personal hygiene device as used for simulation.

The armature 232A has a center of gravity that has at rest coordinates $[x_a; y_a; z_a]$ (with respect to the centers of gravity it is also referred to FIG. 3). As can be seen in the shown embodiment, the armature 232A is offset from the longitudinal axis L. Hence, the z-coordinate $z_a$ is in the shown embodiment offset from the longitudinal axis L, where the z-coordinate of the longitudinal axis is denoted as $z_L$. The secondary mass element 233A has a center of gravity that has at rest coordinates $[x_m; y_m; z_m]$. A skilled person may tend to select the positioning of the secondary mass element such that the z-coordinate of the center of gravity of the secondary mass element 233A coincides with the longitudinal axis, $z_m=z_L$, in particular for reasons of sensible use of available construction volume. Further, the drive shaft 234A has a center of gravity that has at rest coordinates $[x_d; y_d; z_d]$. As the drive shaft 234A extends along the longitudinal axis L, the z-coordinate of the drive shaft 234A is in the shown example coinciding with the z-coordinate of the longitudinal axis L, i.e. $z_d=z_L$. And the first treatment head assembly 120A has a center of gravity that has in rest coordinates $[x_{t1}; y_{t1}; z_{t1}]$. Due to the particular design of the shown example first treatment head assembly 120A, the z-coordinate and the y-coordinate of the center of gravity of the first treatment head assembly 120A are offset from the longitudinal axis L.

In operation, the armature 233A is driven into a reciprocating longitudinal motion M1 and the armature 233A moves together with the drive shaft 234A and the first treatment head assembly 120A. Due to the general principle of the preservation of impulse, the impulse of the driven moving parts is in opposite direction transferred to the support 210A. The spring-mounted secondary mass element 233A will then be excited into a reciprocating linear motion M1' that is shifted in phase by 180 degrees by the forces acting on the support. The mass $M_a$ of the armature 233A, the mass $M_d$ of the drive shaft 234A and the mass ni of the first treatment head assembly 120A add together to the joint mass $M_j$, $M_j=M_a+M_d+M_{t1}$, of the driven parts. It may be desirable to choose the mass $M_m$ of the secondary mass element 233A so that it is essentially identical with the joint mass $M_j$ of the driven moving parts and the spring constant of the spring or springs mounting the secondary mass element 233A to the support may be chosen such that the secondary mass element 233A moves essentially in resonance at the drive frequency at which the armature 232A is driven into motion. By such a design, the forces transferred by the moving parts to the support 210A and from the support 210A to the handle housing 220A essentially cancel each other. But it had been found that some perceivable vibrations are still occurring at the handle housing 220B as was already generally discussed in a previous paragraph.

FIG. 3 shows a multibody block diagram indicating the various coupled masses and their motion constraints, joints and the applied forces that were used in a simulation program to understand the vibrations (i.e. amplitudes). m1 is the mass representing the support 210B and the stator 231B; m2 is the mass of the secondary mass element 233B that is spring mounted at the support 210B and that is constraint for linear motion due to the rigidity of the springs in the directions perpendicular to the longitudinal motion direction; m3 is the mass of the armature 233B and of the drive shaft 234B that are spring mounted at the support 210B and that are likewise constraint into a linear motion, where further a periodically alternating force acts between the stator 231B and the armature 233b to drive the armature 233B into motion; m13 is the mass of the coupling portion 113B of the first treatment head assembly 120B, where it is assumed that the coupling portion 113B is fixedly connected with the drive shaft 234B; m11 is the mass of the rest of the motion transmitter 111B that is pivotably hinged at the coupling portion 113B; m12 is the mass of the first treatment head 110B that is pivotably mounted at the first treatment head housing 112B and the motion transmitter 111B is pivotably mounted at the first treatment head 110B; and finally m10 is the mass of the first treatment head housing 112B that is assumed to be fixedly connected with the support 210B. MP1, MP2, and MP3 are measurement points at which the resulting vibrations of the shown simplified model of the interacting parts are investigated. As is schematically indicated in FIG. 3, at rest the coordinate of the center of gravity of the armature 232B is $[x_a; y_a; z_a]$, the coordinate of the center of gravity of the drive shaft 234B is $[x_d; y_d; z_d]$, the coordinate of the center of gravity of the first treatment head assembly 120B is $[x_{t1}; y_{t1}; z_{t1}]$, and the coordinate of the center of gravity of the secondary mass element 233B is $[x_m; y_m; z_m]$. The Simscape™ Multibody™ software available from MathWorks, Natick, Mass., USA can be used for such a simulation.

Figure 4A:
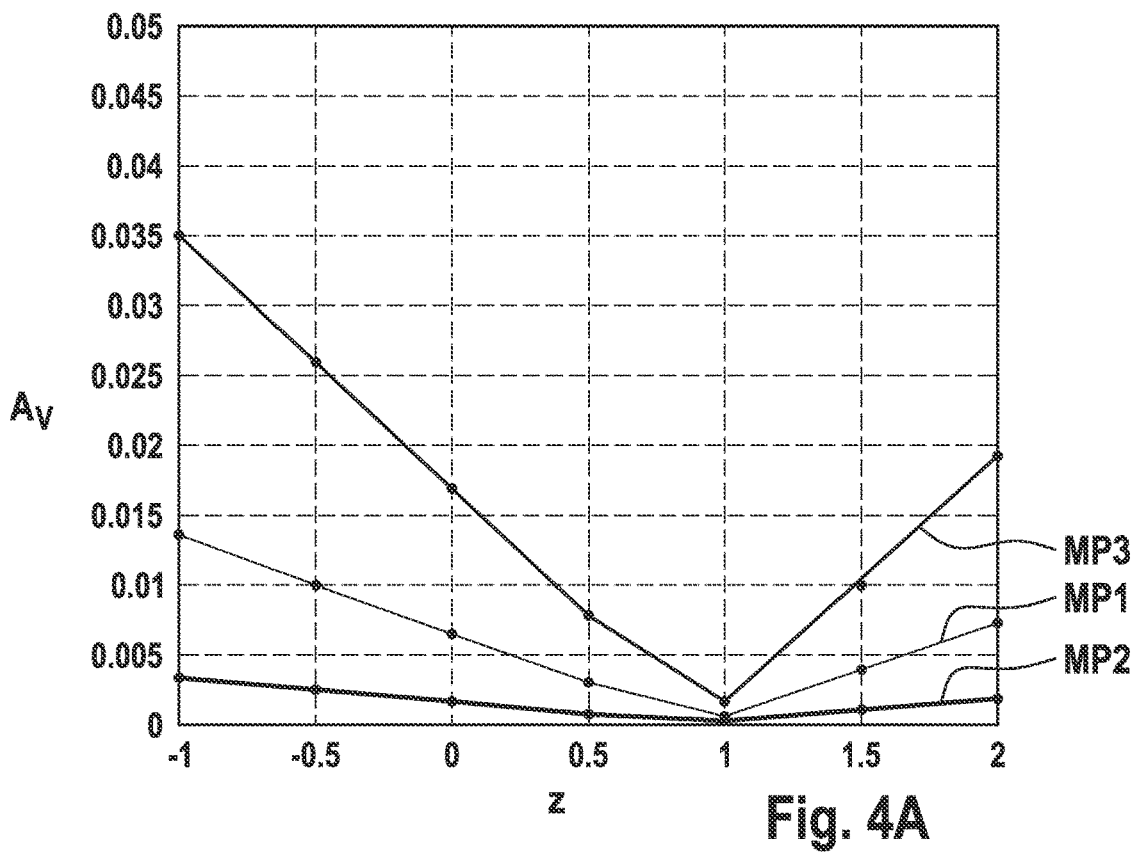
FIG. 4A first simulated results of vibration amplitudes at measurement points MP1, MP2, and MP3 as shown in FIG. 3.
Figure 4B:
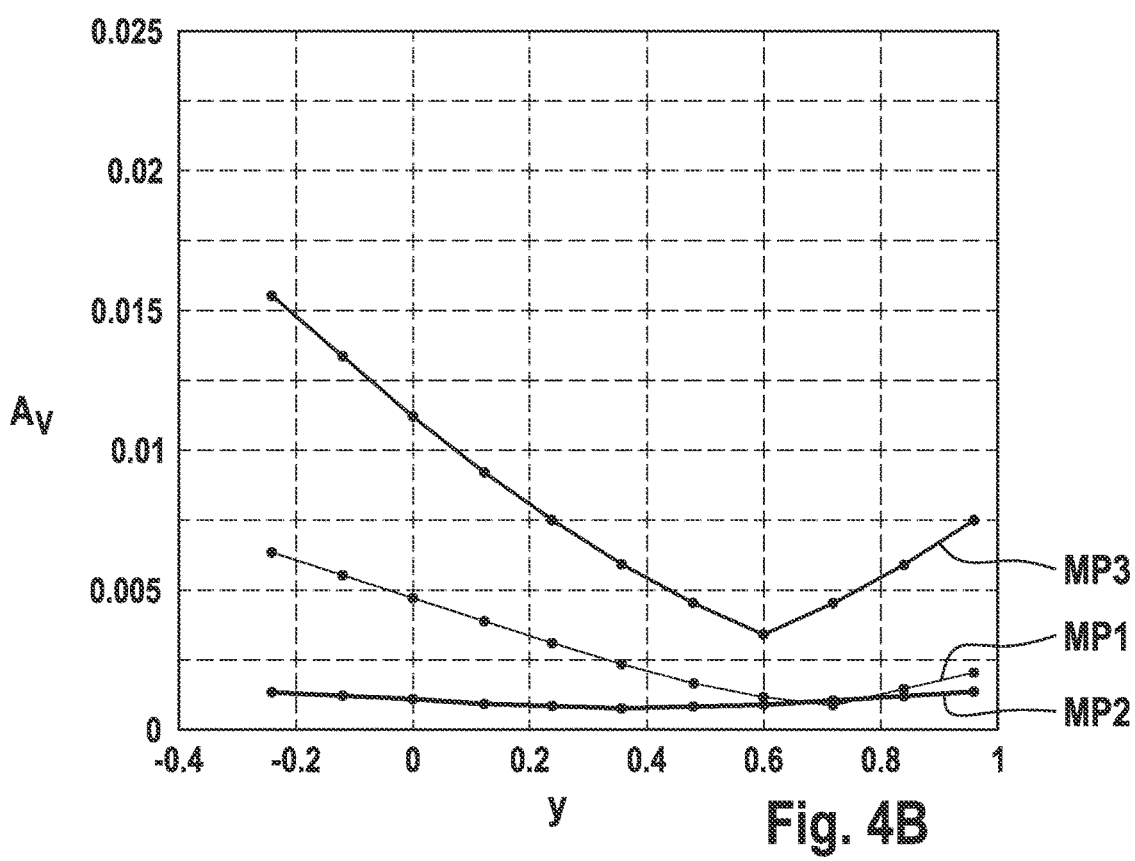
FIG. 4B second simulated results of vibration amplitudes at measurement points MP1, MP2, and MP3 as shown in FIG. 3.

FIGS. 4A and 4B show the simulation results of the effect of shifting the z coordinate and the y coordinate, respectively, of the center of gravity of the secondary mass element 233B of the discussed arrangement on the vibration amplitude $A_v$, where in FIG. 4A the vibration amplitudes in z-direction are shown and in FIG. 4B the vibration amplitudes in y-direction are shown. In FIGS. 4A and 4B, z=0 and y=0 represent a position on the longitudinal center axis of the drive shaft 234B. For the simulation shown in FIG. 4A, the y coordinate of the secondary mass element 233B was fixed at $y_m$=0. For the simulation shown in FIG. 4B, the z coordinate of the secondary mass element 233B was fixed at $z_m$=0. The vibration amplitudes show a minimum for a position of the center of gravity of the secondary mass element that is offset from the longitudinal axis. The effect is more prominent for the offset in z-direction and also more prominent for measurement point MP3 at the distal end tip of the first treatment head housing. In the simulations, the vibration amplitude $A_v$ can be reduced to a level of well below 0.005 mm.

Hence, while the counter-oscillating masses $M_m$ and $M_j$ were already coinciding in an example as discussed in WO 2014/009916 A2 and while the motion of the secondary mass element 233B, the armature 232B, and of the drive shaft 234B are essentially confined to a linear motion, the vibrations that are generated by the moving masses at the support and at the first treatment head housing can be further reduced by optimizing the position of the center of gravity of the secondary mass element 233B. If a joint center of gravity of the armature 232B, the drive shaft 234B and of the first treatment head assembly 120B has at rest a coordinate $[x_j; y_j; z_j]$, then the coordinate $[l_xm; y_m; z_m]$ of the coordinate of the center of gravity of the secondary mass element 233B at rest is best chosen to coincide with the coordinate of the joint center of gravity in y and z direction, i.e. $y_m=y_j$ and $z_m=z_j$.

The user of the personal hygiene device may be irritated when the personal hygiene device has only a very low perceivable vibration amplitude in operation. Thus, in some embodiments, at least one of the z or y coordinates of the center of gravity of the secondary mass element is misaligned by a residual offset distance in the range of between 1 μm and 200 μm, in particular of between 5 μm and 100 μm, with respect to the z coordinate or the y coordinate of the joint center of gravity. By such a measure, the user may experience a low vibration amplitude, which is still perceivable in a reassuring manner.

In some embodiments, the personal hygiene device comprises a second replaceable head. Once attached, the coordinate $[x_{t2}; y_{t2}; z_{t2}]$ of the center of gravity of the second replacement head is different in at least one of the y and z coordinates from the respective center of gravity $[x_{t1}; y_{t1}; z_{t1}]$ of the first replacement head. This allows to control the vibration amplitude felt by the user. E.g. in case the first replacement head has a regular cleaning function and the second replacement head has a function that a user would relate to a higher power, e.g. a polishing function, then the higher vibration amplitude may convey the feeling of a higher power by means of a higher vibration amplitude. A similar effect can be achieved by different masses of the first and second treatment head assemblies. At least one of the two discussed measures may be used.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A personal hygiene device, extending in a 3-dimensional space that is spanned by an x-y-z coordinate system, the device comprising:
a drive unit having a support and a stator fixedly mounted at the support;
an armature that is spring-mounted at the support for driven linear oscillating motion along a first longitudinal direction that is parallel to or coincides with the x-axis of the x-y-z coordinate system, the armature having a center of gravity located in rest at a coordinate $[x_a, y_a, z_a]$ and a drive shaft fixedly coupled with the armature, the drive shaft having a center of gravity located in rest at a coordinate $[x_d, y_d, z_d]$;
a first treatment head assembly detachably connected to the drive shaft, the first treatment assembly having a center of gravity located in rest at a coordinate $[x_{t1}, y_{t1}, z_{t1}]$ and a secondary mass element spring-mounted at the support for essentially linear oscillating motion along the first longitudinal direction, the secondary mass element having a center of gravity located in rest at a coordinate $[x_m, y_m, z_m]$;
wherein at least the coordinate $[x_a, y_a, z_a]$ of the center of gravity of the armature has an offset in at least one of the y-direction and z-direction with respect to the coordinate $[x_d, y_d, z_d]$ of the center of gravity of the drive-shaft or with respect to the coordinate $[x_{t1}, y_{t1}, z_{t1}]$ of the center of gravity of the first treatment head assembly, wherein $y_a \neq y_d$ and/or $y_a \neq y_{t1}$ and/or $z_a \neq z_d$ and/or $z_a \neq z_{t1}$, and the secondary mass element is configured such that the coordinate $[x_m, y_m, z_m]$ of the center of gravity of the secondary mass element is aligned with coordinate $[x_j, y_j, z_j]$ of a joint center of gravity of a combination of the drive shaft, the first treatment head assembly, and the armature in the at least one offset direction, wherein $y_m = y_j$ and $z_m = z_j$, so that a line connecting the coordinate $[x_m, y_m, z_m]$ of the center of gravity of the secondary mass element and the coordinate $[x_j, y_j, z_j]$ of the joint center of gravity is parallel to or coincides with the x-axis,
wherein an alignment of the coordinates in the offset direction has a residual offset of from 5 µm to 100 µm.

2. The device of claim 1, having a handle housing that can be grasped by a hand of a user and a first treatment head housing that is detachably attached to an attachment portion of the support.

3. The device of claim 2, wherein the support of the drive unit is mounted for a pivoting motion around a pivot axis with respect to the handle housing such that the pivot axis is generally parallel to the y-axis of the x-y-z coordinate system and a resilient element is arranged between the handle housing and the support to provide a restoring force against the pivoting motion and wherein a pressure or force applied at the first treatment head housing having a pressure or force component along a direction parallel to the z-axis of the x-y-z coordinate system leads to a pivoting motion of the support around the pivot axis against the restoring force of the resilient element.

4. The device of claim 3, wherein the support is coupled with a pressure sensor or force sensor for measuring the pressure or force applied at the first treatment head housing based on the deflection of the support with respect to the handle housing.

5. The device of claim 2, wherein the first treatment head assembly is movably mounted at the first treatment head housing and the first treatment head assembly and the first treatment head housing together form a first replacement head.

6. The device of claim 5, wherein the first treatment head assembly comprises a first motion transmitter that is detachably coupled with the drive shaft and with a first treatment head that is movably mounted at the first treatment head housing for driven oscillatory rotation around a rotation axis that is parallel to the z-direction.

7. The device in accordance with claim 6, wherein the motion transmitter and the drive shaft are coupled by a magnetic coupling.

8. The device of claim 5, wherein the drive unit is arranged to drive the first treatment head assembly with a frequency selected from the group consisting of a frequency between 100 Hz and 200 Hz, a frequency between 120 Hz and 170 Hz, and a frequency between 140 Hz and 150 Hz.

9. A personal hygiene device kit comprising the device of claim 5, the kit comprising at least a second replacement head comprising a second treatment head housing and a second treatment head assembly, wherein in the attached state the center of gravity of the second treatment head assembly has a coordinate $[x_{t2}, y_{t2}, z_{t2}]$ that has an offset with respect to the coordinate $[x_{t1}, y_{t1}, z_{t1}]$ of the center of gravity of the first treatment head assembly in at least one of the y-direction or z-direction or where the first treatment head assembly has a weight that is different to the weight of the first treatment head assembly.

10. The device of claim 1, wherein a ratio of the weight of the support and parts mounted at the support to the weight of the handle and parts mounted at the handle other than the support is 0.2 or below.

11. The device of claim 1, wherein the secondary mass element is made from stacked metal sheets.

12. The device of claim 1, wherein the armature and the secondary mass element are mounted at the support by leaf springs that each extend at rest in a plane parallel to the y-z plane of the x-y-z coordinate system.

* * * * *